(12) United States Patent
Furukawa et al.

(10) Patent No.: US 7,085,954 B2
(45) Date of Patent: Aug. 1, 2006

(54) STORAGE SYSTEM PERFORMING REMOTE COPYING BYPASSING CONTROLLER

(75) Inventors: Hiroshi Furukawa, Sagamihara (JP); Etsutaro Akagawa, Kawasaki (JP); Manabu Kitamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 10/649,649

(22) Filed: Aug. 28, 2003

(65) Prior Publication Data
US 2004/0215673 A1    Oct. 28, 2004

(30) Foreign Application Priority Data
Apr. 25, 2003    (JP)    ............... 2003-120898

(51) Int. Cl.
*G06F 12/02* (2006.01)
(52) U.S. Cl. ............. 714/5; 709/223; 709/217; 705/67
(58) Field of Classification Search ............ None
See application file for complete search history.

(56) References Cited

U.S. PATENT DOCUMENTS

| | | | |
|---|---|---|---|
| 6,014,686 A | 1/2000 | Elnozahy et al. | |
| 6,237,008 B1 | 5/2001 | Beal et al. | |
| 2001/0044747 A1* | 11/2001 | Ramachandran et al. | 705/16 |
| 2002/0152179 A1* | 10/2002 | Racov | 705/67 |
| 2003/0154305 A1 | 8/2003 | Bethmangalkar et al. | |
| 2003/0163553 A1 | 8/2003 | Kitamura et al. | |
| 2004/0024979 A1 | 2/2004 | Kaminsky et al. | |

OTHER PUBLICATIONS

"Hitachi TrueCopy realizing disaster recovery by remote copy", [online], the home page of Hitachi, Ltd. SANRISE series Technical Information/Technical Description, http://www.hitachi.co.jp/Prod/comp/storage/sanrise/technifo/htc/index.html> as Viewed on Jun. 26, 2003.
"Integrated User Adminstration Assistant Software Solution UserAdmin", [online], the home page of Soliton Systems K.K., Introduction of handled products, http://net.soliton.co.jp./products/soliton/useradmin/useadmin.html>  as Viewed on Jun. 26, 2003.

* cited by examiner

*Primary Examiner*—B. James Peikari
(74) *Attorney, Agent, or Firm*—Mattingly, Stanger, Malur & Brundidge, P.C.

(57) ABSTRACT

A storage system according to an embodiment of the present invention has a storage and a controller. The storage has an interface for connecting it to a storage of another storage system via a communication line, and a remote copy module transferring predetermined data to the another storage system, not via the controller, based on a data transfer command from the controller. The controller has a remote copy control module transmitting to the remote copy module, at reception of a notification of account attribute movement from an account monitor module monitoring the account attribute movement, a data transfer command for transferring predetermined data to the other storage system, not via the controller.

15 Claims, 12 Drawing Sheets

STORAGE SYSTEM PERFORMING REMOTE COPYING BYPASSING CONTROLLER

BACKGROUND OF THE INVENTION

The present invention relates to control of a method for copying data from a main storage to a sub storage.

Control of a method for copying data of a storage area is known wherein data is redundantly stored in two or more storages at remote locations, in order to improve the reliability of data held in the storage area and to evade data loss resulting from a disaster such as a fire or an earthquake.

The technique as shown in "Hitachi TrueCopy realizing disaster recovery by remote copy", ([online], the home page of Hitachi, Ltd., SANRISE series Technical Information/ Technical Description, [printed on Jun. 26, 2003], Internet &1t; URL: http://www.hitachi.co.jp/Prod/comp/storage/sanrise/tech info/htc/index.html>) ("Hitachi TrueCopy") can realize data copy for a volume between two storages existing at remote locations without transferring the data via a host computer, and can quickly perform data transfer to a remote center with a disaster measure, and can also perform relocation and integration of a data center so as to be independent from the host computer.

In a LAN (Local Area Network) and WAN (Wide Area Network) as a network connecting a plurality of host computers using a storage area, a user account exists as authentication information for accessing apparatuses on the network and resources of an application.

With today's larger networks, user accounts are increasingly managed together with hierarchical information on user belonging or authentication on a dedicated account management server. In addition, a dedicated storage area (home directory) for each user corresponding to a user account can be held on a volume in a storage.

When user account movement is performed on an account management server due to the user's own transfer of the account, a corresponding home directory movement of the user on a volume is necessary.

In "Integrated User Administration Assistant Software Soliton UserAdmin", ([online], the home page of Soliton Systems K.K., Introduction of handled products, [printed on Jun. 26, 2003], Internet &1t; URL: http://net.soliton.co.jp/ products/soliton/useradmin/use admin.html>)("UserAdmin") with user movement on an account management server, home directory movement on a volume can be performed using a file copy function between host computers.

In UserAdmin described above, with user account movement, home directory movement of a targeted user on a volume in a storage can be performed between host computers (that is, via a LAN or WAN). Since the movement is betweenhost computers (in contrast to Hitachi TrueCopy), processing occurs in which the host computers read out data, so as not to make copy processing with the movement faster. In addition, copy processing is executed using a network of a LAN or WAN connecting many kinds of computers. When the host computers execute other processing, the copy processing cannot be executed quickly, resulting in delay of the copy processing. Further, the load itself of the host computers themselves is increased due to the processing.

In the technique of Hitachi TrueCopy, the copy unit is a volume unit. Its function cannot be used as user movement in home directory units. With user account movement, a function using a copy function to move a targeted volume cannot be realized.

SUMMARY OF THE INVENTION

An object of the present invention is to permit, with account movement, an increase of the speed of data transfer of an exclusive storage area of a targeted account (a home directory of a user) and reduction of the load of a controller of a host computer.

A storage system according to an embodiment of the present invention has a storage and a controller. The storage has an interface for connecting it to a storage of another storage system via a communication line, and a remote copy module transferring predetermined data to the storage of the destination storage system via the communication line, not via the controller, based on a data transfer command from the controller. The controller has a remote copy control module transmitting, to the remote copy module, at reception of a notification of account movement from an account monitor module monitoring the change of an attribute with the account movement, a data transfer command for transferring predetermined data stored into the storage via the communication line to the another storage system.

A management program according to another embodiment allows a management computer to execute: a policy of receiving a notification of account movement from an account monitor module monitoring the change of an attribute with the account movement; and a policy of transmitting, at reception of the movement notification, to a storage system related as an account moving side, a data transfer command for transferring, to a storage system related as an account moved side, predetermined data stored into a storage via a communication line connecting the storages of the plurality of storage systems, not via the controller.

Other features of the present invention will be apparent from the description of this specification and the accompanying drawings.

DESCRIPTION OF THE PREFERRED EMBODIMENT

A control function realizing copy of a storage area in a storage in file and directory units, not in the current volume units, as an assumption of this embodiment, will be described with FIGS. 1 to 6.

Figure 1:
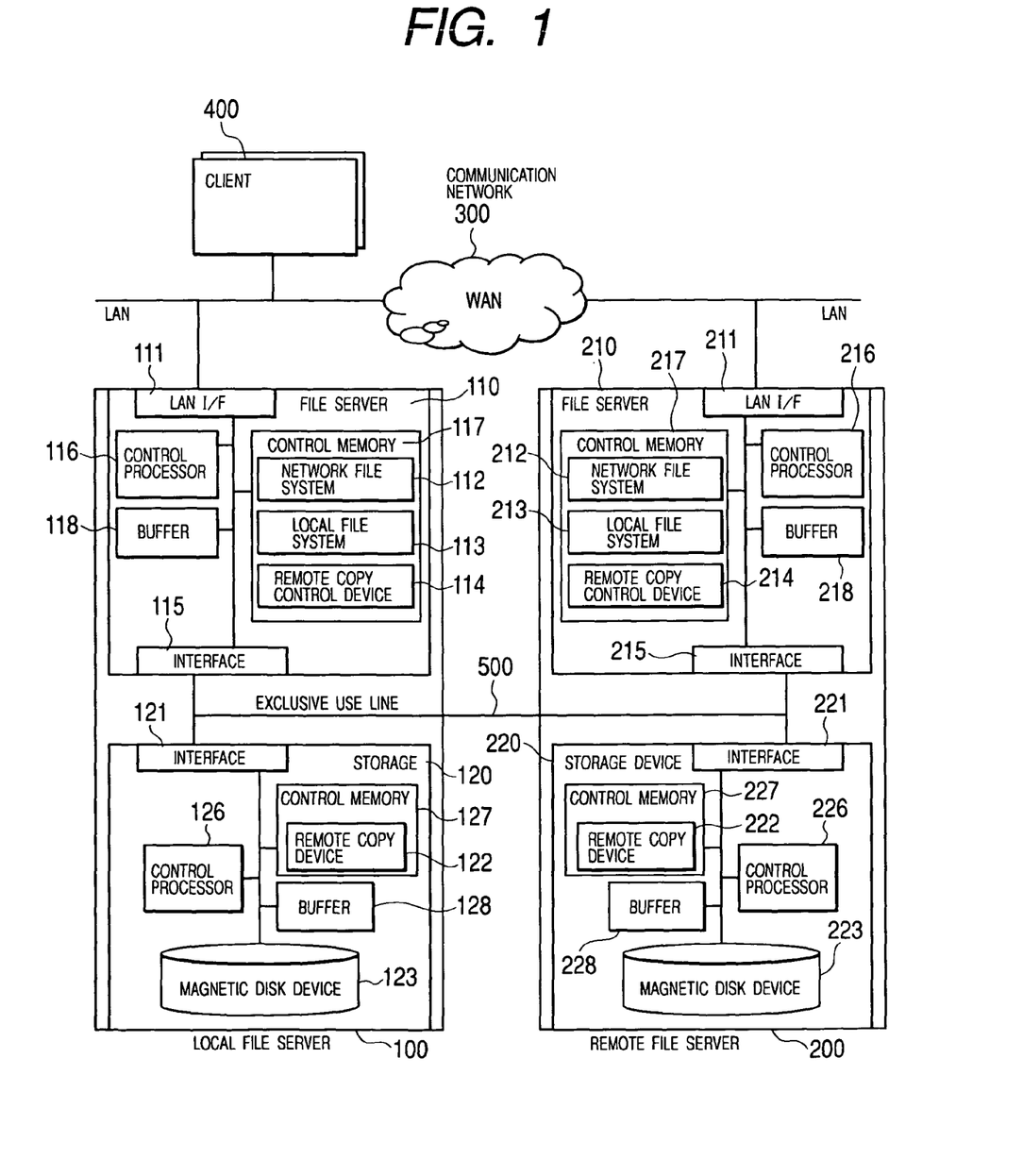
FIG. 1 is a block diagram showing an example of a storage system configuration according to an embodiment of the present invention.

FIG. 1 is a block diagram of assistance in explaining a system configuration of a method for copying data from a main storage to a sub storage. As shown in the block diagram of FIG. 1, the system has a local file server (including a main storage) 100 and a remote file server (including a sub storage) 200. A plurality of remote file servers 200 may exist with respect to one local file server 100. The servers 100, 200 are called NAS (Network Attached Storage) and have file servers (controllers) 110, 210 equivalent to host computers, and storages 120, 220.

The file servers 110, 210 are connected to a communication network 300 such as a LAN or WAN via suitable communication interfaces 111, 211 such as a LAN interface. The communication network 300 is connected to computers (host apparatus and external apparatus) such as a client 400 and an account management server. Data is transmitted from the client 400 via the communication network 300 to the file server 110 of the local file server 100. The file server 110 transfers the received data to the storage 120.

The storage 120 of the local file server 100 and the storage 220 of the remote file server 200 are interconnected via a dedicated line called a fiber channel (communication line) 500.

The file server 110 of the local file server 100 has, as a hardware configuration, a control processor 116 integrally controlling the entire operation, a control memory 117 storing a program executed by the control processor and data, and a buffer 118 temporarily storing data. The file server 110 of the local file server 100 has a network file system 112, a local file system 113, and a remote copy control device 114 on a control memory 117; and an interface 115. The network file system 112 has a function executing data communication processing with the client computer 400. The local file system 113 has a function executing processing of transferring data transmitted from the client 400 via the interface 115 to the storage 120.

The network file systems 112, 212, local file systems 113, 213, later-described account management server monitors 119, 219, remote copy control devices 114, 214, and later-described file server performance monitors 131, 231 are program modules so that they are executed by the control processors 116, 216 to realize their functions. These modules may be stored into a recording medium (flexible disk, CD-ROM, DVD-ROM, semiconductor memory, transmission path such as a LAN or SAN) which can be read by the respective controllers. The functions of these modules may also be realized by a hardware configuration (semiconductor integrated circuit such as LSI (Large Scale Integration)).

The remote file server 200 has the same configuration and function as the above-described local file server 100. The file server 210 has the network file system 212, the local file system 213, and the remote copy control device 214 on a control memory 217; and an interface 215. The network file system 212 has a function executing data communication processing with the client 400. The local file system 213 has a function executing processing of transferring data transmitted from the client 400 via the interface 215 to the storage 220.

The remote copy control device 114 on the local file server 100 side controls the remote copy device 122 of the storage 120. Specifically, a data transfer command requesting copy of data stored in the storage 120 to the remote file server 200 side is issued via the interface 115 to the storage 120.

The remote copy devices 122, 222 are program modules so that they are executed by control processors 126, 226 to realize their functions. These modules may be stored into a recording medium (flexible disk, CD-ROM, DVD-ROM, semiconductor memory, transmission path such as a LAN or SAN) which can be read by the respective controllers. The functions of these modules may be realized by a hardware configuration (semiconductor integrated circuit such as LSI (Large Scale Integration)).

The storages 120, 220 have interfaces 121, 221, the remote copy devices 122, 222, and magnetic disk apparatuses 123, 223, respectively.

The remote copy devices 122, 222 of the storages 120, 220 have, as a hardware configuration, the control processor 126 integrally controlling the entire operation, a control memory 127 storing a program executed by the control processor and data, and a buffer 128 temporarily storing data. The remote copy device 122 on the local file server 100 side receives a data transfer command from the remote copy control device 113 of the file server 110 via the interface 121. The remote copy device 122 which has received the data transfer command reads out data from the magnetic disk apparatus 123 to transfer it via the dedicated line 500 to the storage 220 on the remote file server 200 side.

The remote copy device 222 of the storage 220 of the remote file server 200 receives the data transferred from the local file server 100 side to store it into the magnetic disk apparatus 223.

Figure 2:
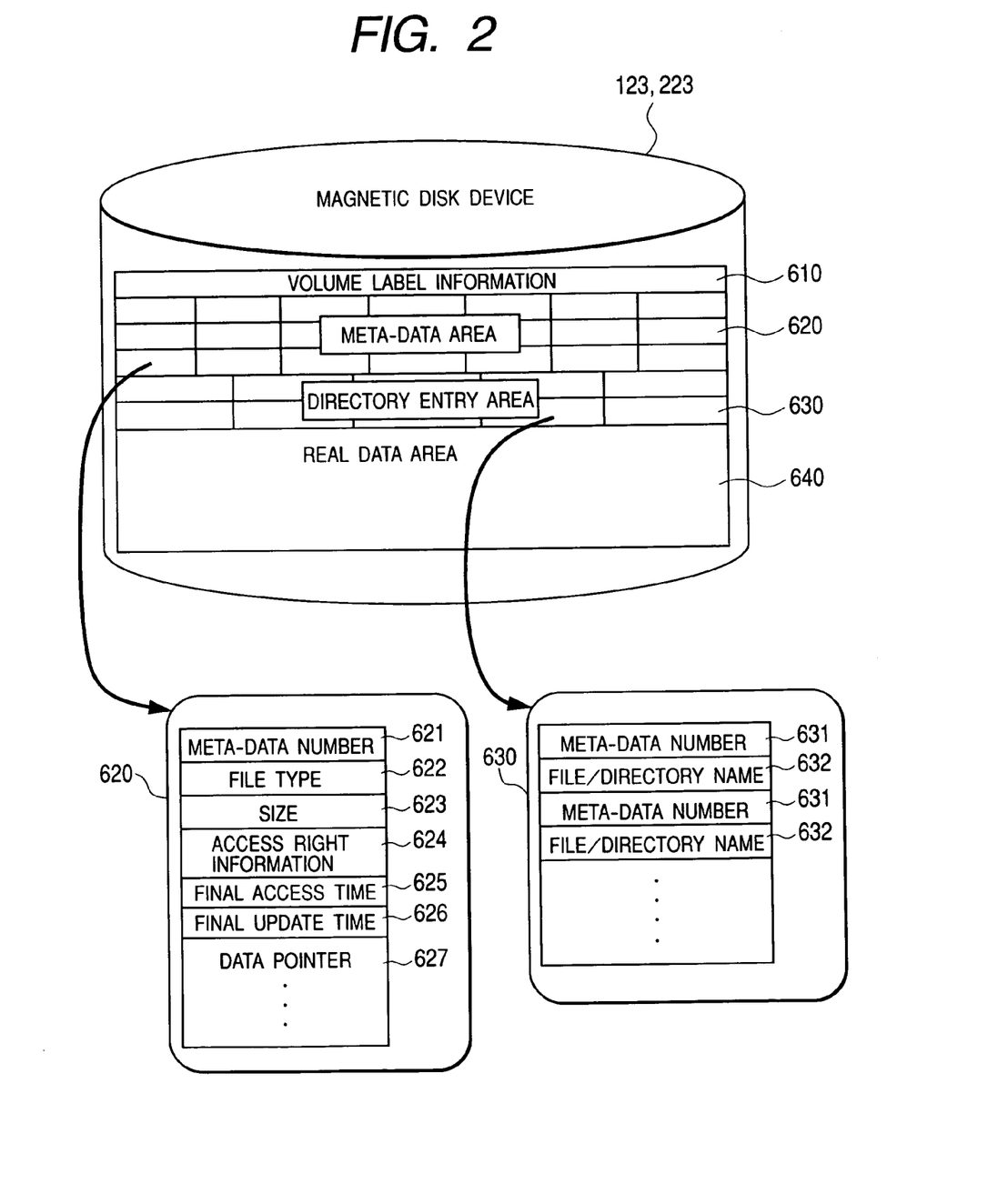
FIG. 2 is a data structure diagram showing a file system structure of magnetic disk apparatuses in a storage system according to an embodiment of the present invention.

FIG. 2 is an example of a data structure diagram of a file system of the magnetic disk apparatuses 123, 223.

As shown in FIG. 2, the file system has a data management information area having volume label information 610, a meta-data area 620 and a directory entry area 630, and a real data area 640. The meta-data area 620 has a meta-data number 621, a file type 622, a size 623, access right information 624, final access time 625, final update time 626, and a plurality of data pointers 627. The directory entry area 630 includes a plurality of combinations of a meta-data number 631 and a file/directory name 632.

Figure 4:
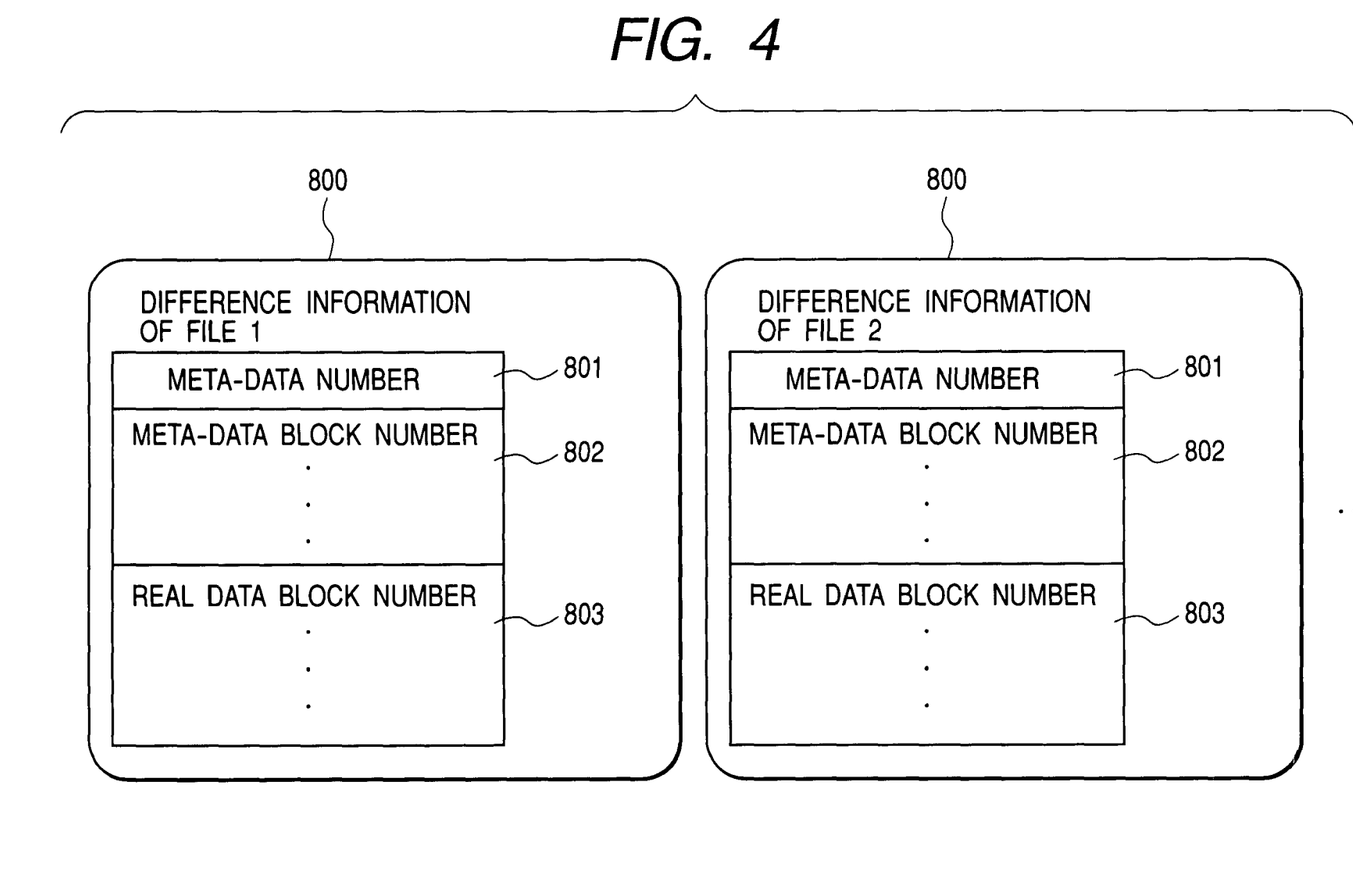
FIG. 4 is a data structure diagram showing difference information stored by a remote copy control device of a local file server stores into its own control memory in a storage system according to an embodiment of the present invention.

FIG. 4 is an example of a data structure diagram of difference information (information on updated data) read out by the remote copy control device 114 from the control memory 117 and used in the local file server 100.

The information on updated data is stored as difference information when file update processing occurs from the client 400 to the local file server 100 during remote copy processing and when only necessary data, that is, only a necessary file and directory are remote copy processed from the local file server 100 to the remote file server 200. The difference information is used when the remote copy control device 114 gives a remote copy command to the remote copy device 122 in later-described difference copy processing.

As shown in FIG. 4, file difference information 800 of files 1, 2, . . . , is generally generated by the local file system 113. Each piece of the difference information 800 has a meta-data number 801, a plurality of meta-data block numbers 802, and a plurality of real data block numbers 803.

When remote copying only necessary data from the local file server 100 to the remote file server 200, in addition to the information created by the local file system 113, the remote copy control device 114 creates in a pseudo manner, as difference information of each of the files corresponding to unnecessary data, difference information in the form of FIG. 4 in which the targeted file is erased, so as to add the difference information to achieve the object.

Figure 3:
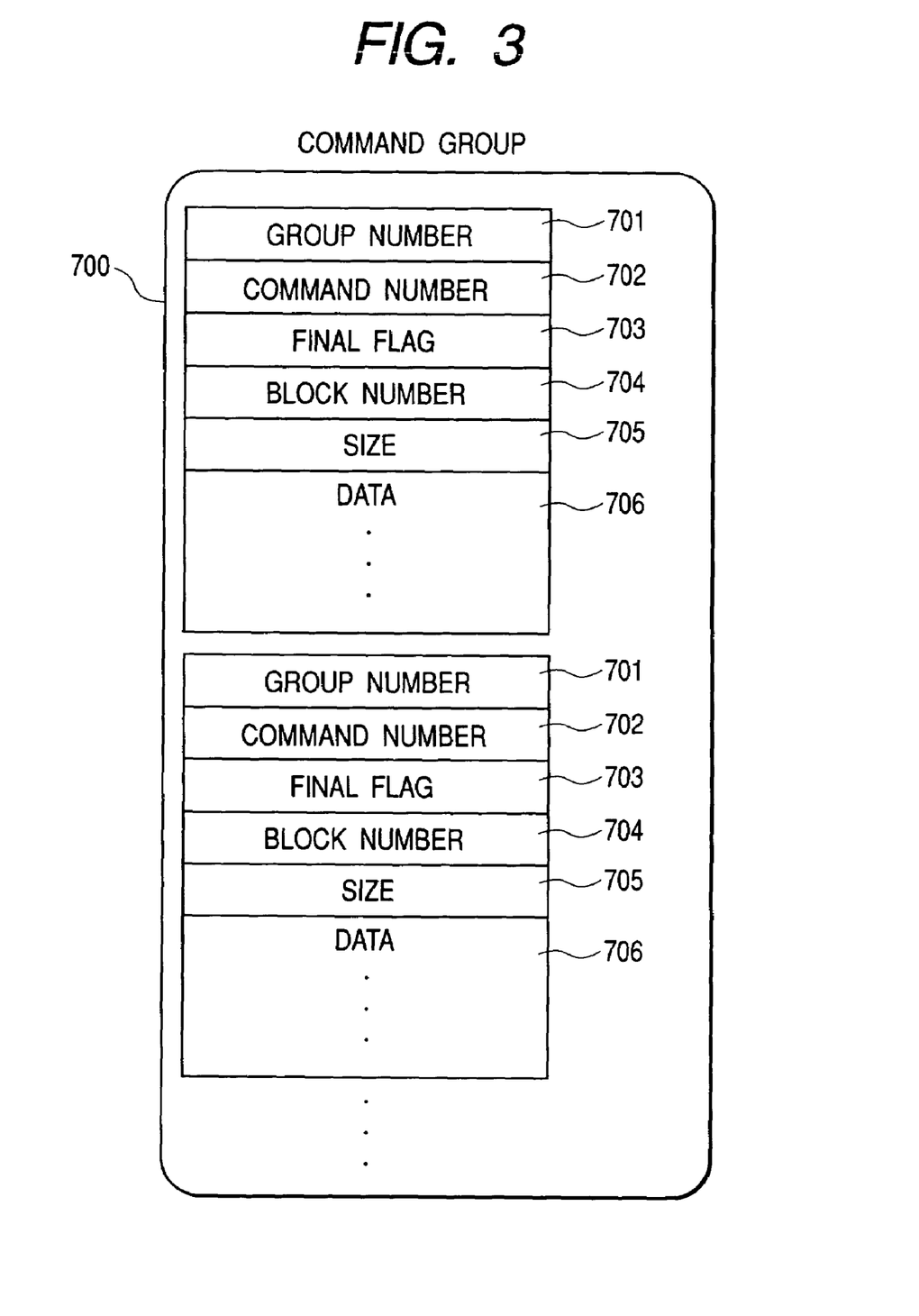
FIG. 3 is a data structure diagram showing the structure of a remote copy command issued from a remote copy control device of a file server of a local file server to a remote copy device of a storage in a storage system according to an embodiment of the present invention.

FIG. 3 is the structure of a remote copy command that the remote copy device 122 of the storage 120 in the local file server 100 issues to the storage 220 in the remote file server 200.

As shown in FIG. 3, remote copy commands 700 consist of a plurality of grouped commands. Each of the commands 700 has a group number 701, a command number 702, a final flag 703, a block number 704, a size 705, and data (successive real data) 706.

In copy processing of one file, the remote copy control device 114 transfers the difference information shown in FIG. 4 to the remote copy device 122. The remote copy device 122 generates, based on the difference information, one or a plurality of commands given the same group number 701. The remote copy device 222 in the storage 220 executes writing of a series of the received commands into the magnetic disk apparatus 223 for each of the commands given the same group number 701.

Specifically, when receiving a plurality of commands given the same group number 701, writing into the magnetic disk 223 is not executed until all the commands given the same group number 701 reach the remote copy device 222. When the plurality of commands given the same group number 701 all reach the remote copy device 222, writing into the magnetic disk 223 is executed. The decision can be performed by checking whether the commands in which the command number 702 is smallest and the final flag 703 is ON all reach the remote copy device 222. This can prevent a certain file from being written in an incomplete state into the storage 220 of the remote file server 200.

The remote copy processing of the storage system according to this embodiment will be described. In the remote copy processing, initial copy processing in which all file and directory data written into the local file server 100 are copied to the remote file server 200 is performed first. Subsequently, difference copy processing in which the file and directory data, updated from the client 400 to the local file server 100, is copied to the remote file server 200 is performed.

Figure 5:
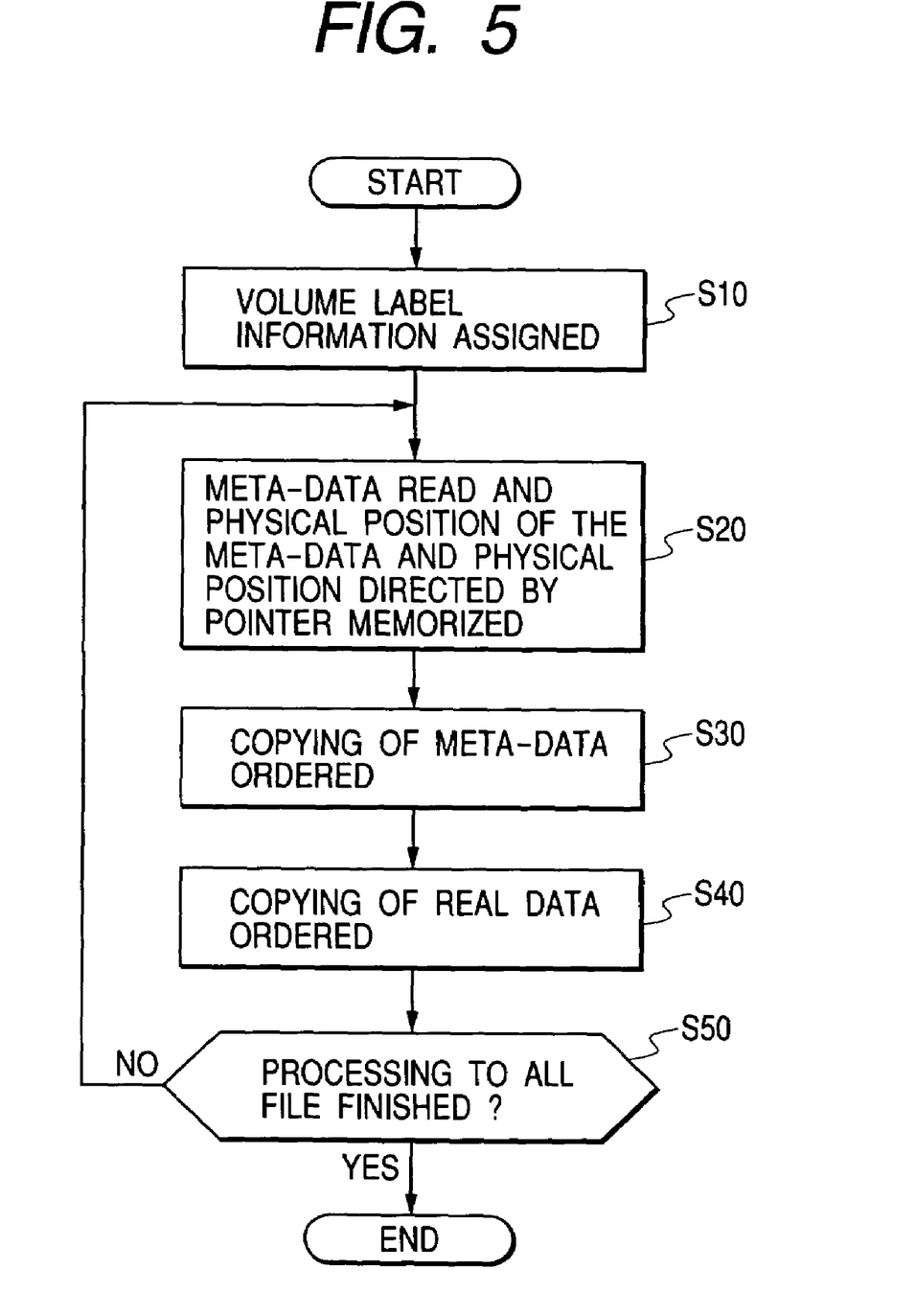
FIG. 5 is a flowchart showing initial copy processing in a storage system according to an embodiment of the present invention.

FIG. 5 is a flowchart of the initial copy processing according to this embodiment.

After start, the remote copy control device 114 (see FIG. 1) of the local file server 100 commands the remote copy device 122 (see FIG. 1) of the storage 120 to copy the volume label information 610 (see FIG. 2) (S10).

The remote copy control device 114 commands the local file system 113 to read out the meta-data 620. The local file system 113 transmits, to the remote copy control device 114, the physical position of the meta-data 620 and the physical position indicated by the data pointer 627 (see FIG. 2). The remote copy control device 114 stores the transmitted physical positions (S20).

The remote copy control device 114 commands the remote copy device 122 to copy the meta-data 620 (S30). The remote copy device 122 transmits a command group as shown in FIG. 3 via the fiber channel 500 (see FIG. 1) to the remote copy device 222 of the storage 220 on the remote file server 200 side. The remote copy device 222 acquires data from the transmitted command group to store it into the magnetic disk apparatus 223.

The remote copy control device 114 commands the remote copy device 122 to copy the real data 640 (S40). The remote copy device 122 transmits a command group as shown in FIG. 3 via the fiber channel 500 to the remote copy device 222 on the remote file server 200 side. The remote copy device 222 acquires data from the transmitted command group to store it into the magnetic disk apparatus 223.

The remote copy control device 114 checks whether copy of all data files of the magnetic disk apparatus 123 (see FIG. 1) of the storage 120 of the local file server 100 to the magnetic disk apparatus 223 (see FIG. 1) of the storage 220 on the remote file server 200 side is complete (S50). After the checking, when copy of all the data files is complete, the initial copy is ended (S50: YES→End). When copy of all the data files is not complete (S50: NO), the processing from S20 is executed.

Figure 6:
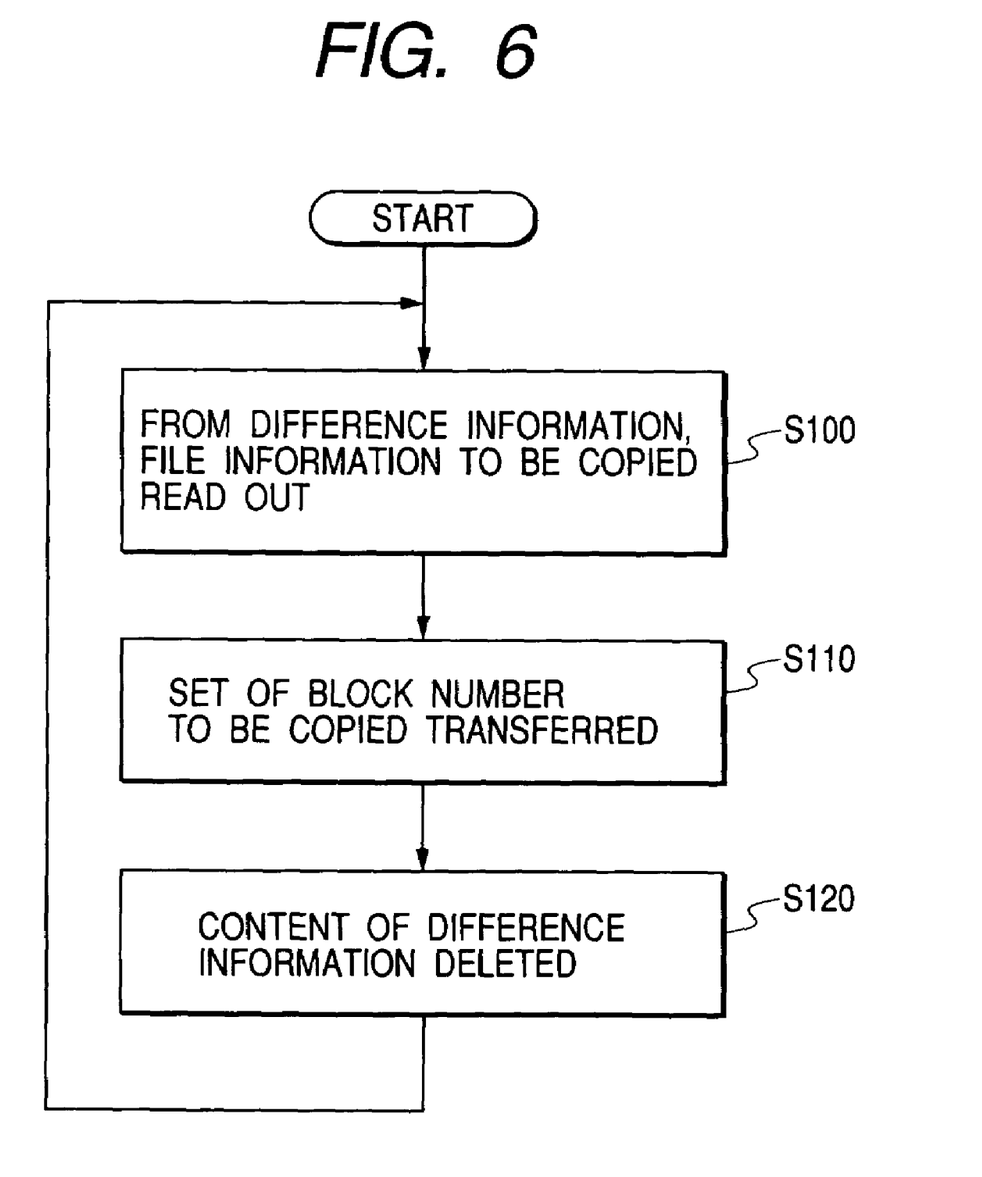
FIG. 6 is a flowchart showing difference copy processing in a storage system according to an embodiment of the present invention.

FIG. 6 is a flowchart of the difference copy processing of the storage system.

After start, the remote copy control device 114 (see FIG. 1) of the local file server 100 acquires file information copied based on the difference information 800 shown in FIG. 4 from the control memory (S100). When copying only necessary data, the remote copy control device 114 creates, in the processing of S100, pseudo difference information in which an unnecessary file is erased.

A combination of block numbers 802, 803 (see FIG. 4) is transmitted from the acquired file information to the remote copy device 122 (see FIG. 1) of the storage 120 (S110). The remote copy device 122 reads out the corresponding data from the magnetic disk apparatus 123 (FIG. 1) based on the transmitted combination of the block numbers 802, 803 to generate a command group as shown in FIG. 3. The remote copy device 122 transmits the generated command group via the fiber channel 500 (see FIG. 1) to the remote copy device 222 of the storage 220 on the remote file server 200 side.

The difference information corresponding to the copied data is erased (S120). The remote copy device 222 acquires the data from the transmitted command group to store it into the magnetic disk apparatus 223 (see FIG. 1). The difference information is stacked each time file update occurs on the local file server 100. Data copy can be realized between the storage systems (from the main storage to the sub storage) by continuing to execute the processing shown in FIG. 6. Copy of only necessary data can be realized in file and directory units between the storage systems, which is necessary in this embodiment.

There will be described a system configuration copying a home directory of a targeted user from the main storage to the sub storage on a user account management server at user account movement, using the control function realizing copy of the storage area in the storage in file and directory units, not in volume units, which is described in FIGS. 1 to 6.

Figure 7:
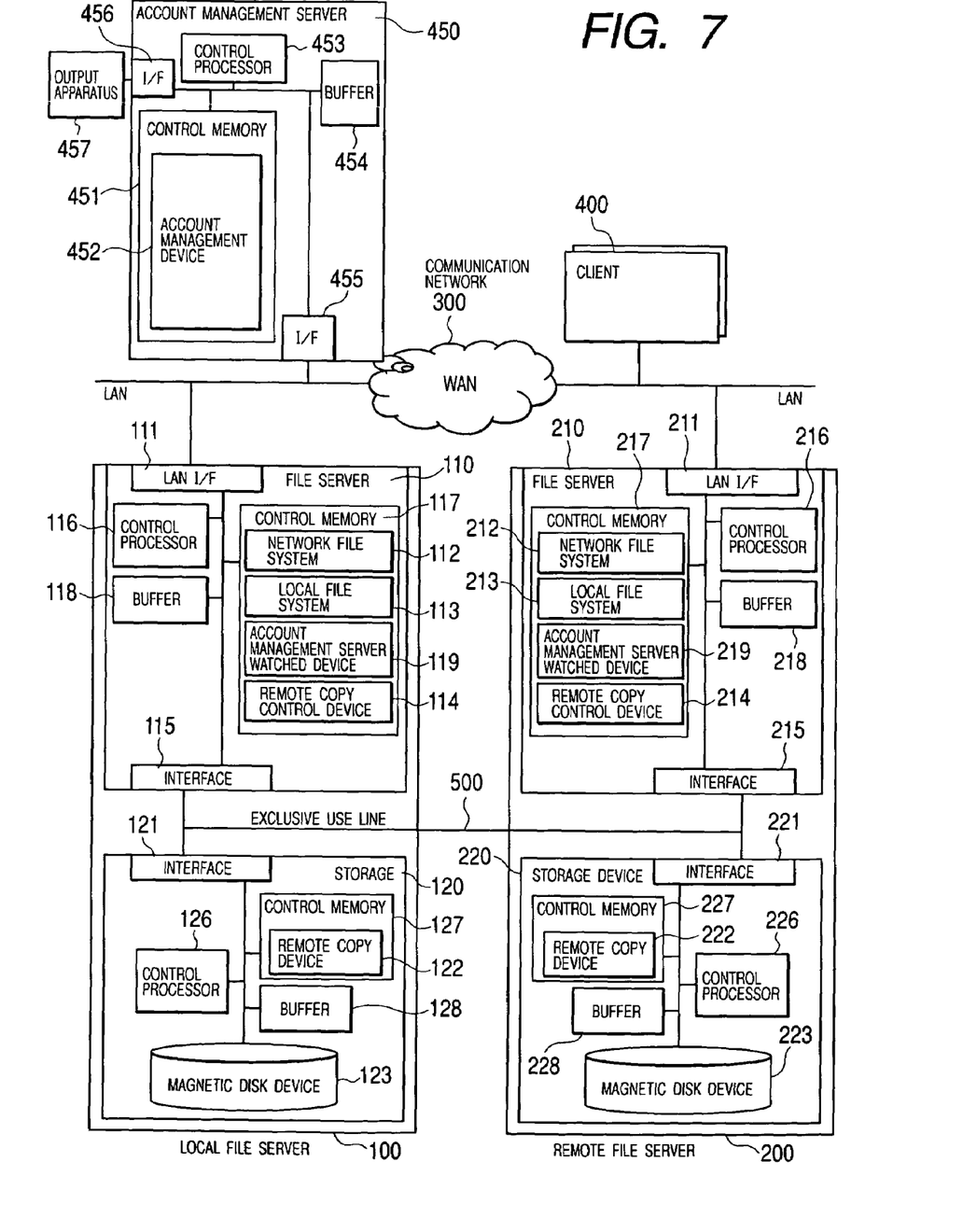
FIG. 7 is a block diagram showing an example of a storage system configuration moving a home directory of a user with user account movement according to an embodiment of the present invention.

FIG. 7 is a configuration diagram of a network system according to an embodiment of the present invention.

Basically, the present configuration has the same configuration as that of the block diagram of FIG. 1. A difference between the two configurations will be mainly described. In particular, an account management server 450 is connected to the communication network 300, and the account management server monitors 119, 219 monitor account management information of the account management server 450 on the control memories on the file servers 110, 210. The account management server 450 is a computer having the same hardware configuration as that of the file servers 110, 210 and has an output apparatus 457 displaying information and an interface 456 to the output apparatus 457.

The account management server 450 is a computer managing account management information on a control memory 451. A suitable example of the account management server 450 is an LDAP (Lightweight Directory Access Protocol) server.

The account management information includes information for authenticating an account used by the client 400 when using the file servers 110, 220 (such as user ID and application ID), an attribute for each account such as (information related to the user authentication (the name of an enterprise, the name of a unit, and the position name/area name of the unit), information related to an application environment (such as server path and directory path), and information (ID) indicating the file servers 100, 200 storing data corresponding to the account.

Figure 8:
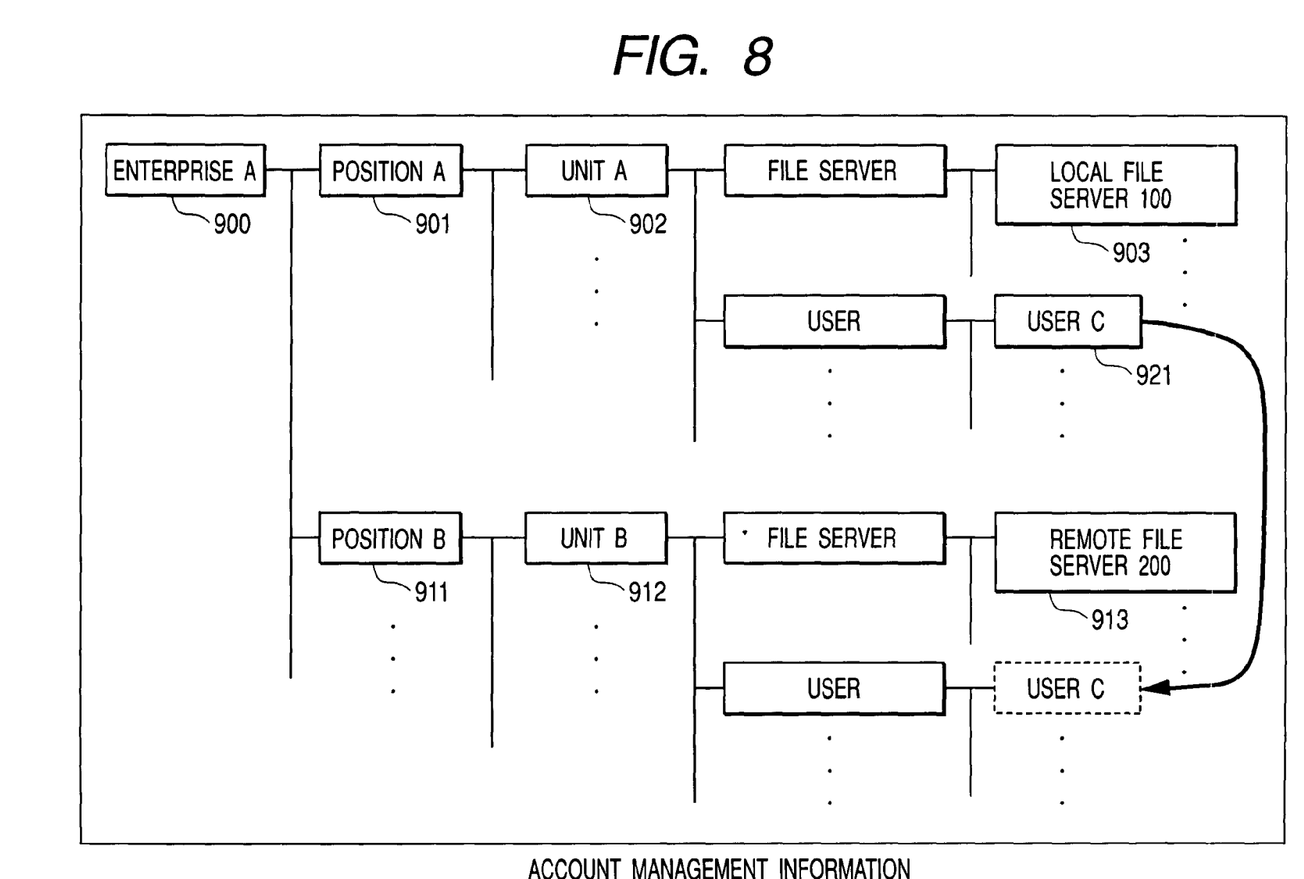
FIG. 8 is a data structure diagram showing the structure of account management information owned by an account management server according to an embodiment of the present invention.

FIG. 8 is an example of account management information according to an embodiment of the present invention.

As shown in FIG. 8, the account management information is managed as information of a hierarchical tree structure called a name service. The user account is defined as one element of the tree structure. The tree structure is generally defined as having a logical tree structure of an authentication unit in an enterprise and a physical tree structure of a position where the unit exists. When movement of a user's authentication is performed, as shown in FIG. 8, the tree structure of the user account is moved on the account management server to be moved to the tree structure in an optimum position as the user movement operation of a manager. In this case, the physical tree structure is also changed. With it, the login destination must be changed from the file server the user has used (logged in) previously to a new file server. FIG. 8 shows, as an image, movement assuming that user C (921) who has used the local file server 100 (903) existing under position A (901) and unit A (902) uses the remote file server 200 (913) existing under position B (911) and unit B (912) due to unit movement.

A user often owns a home directory as a storage area only for the user in a disk volume on a file server. With the file server movement, the manager must execute the home directory movement operation of the user C (921). Information of the home directory is managed by an account management device 452 of the account management server 450.

In this embodiment, there will be described, with the configuration of the block diagram of FIG. 7, a flow of specific processing of a method for executing the home directory movement operation at the user movement, performed by the manager as a file copy function of the file server via the public line 300, using the control function of copy of the storage area in the storage in file and directory units.

Figure 9:
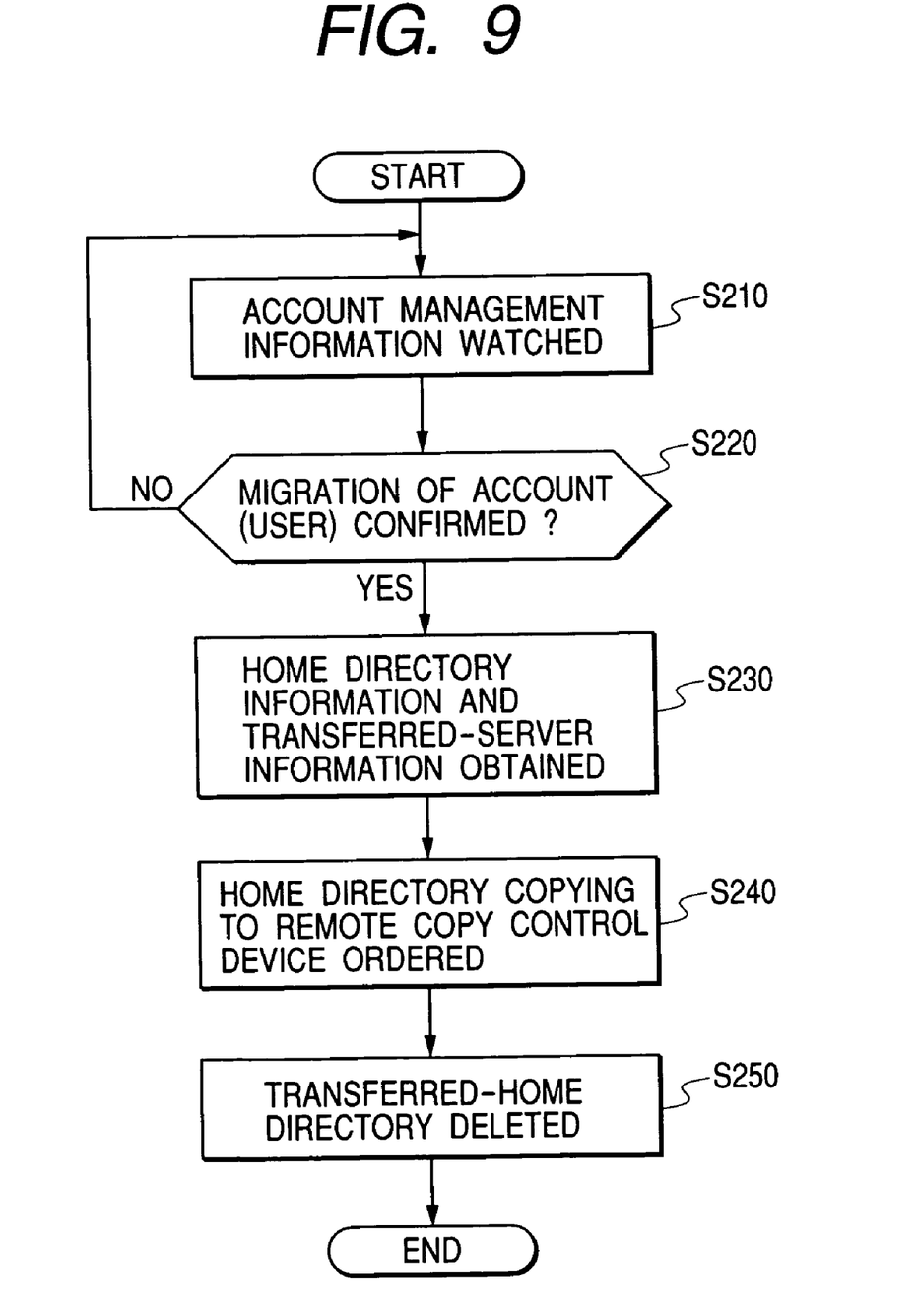
FIG. 9 is a flowchart showing home directory movement processing at user account movement according to an embodiment of the present invention.

FIG. 9 is a flowchart of home directory movement processing at user movement according to this embodiment.

After start, the account management server monitor 119 on the local file server 100 monitors user movement with the account management information of the account management device 452 on the account management server 450 at fixed intervals (S210). The account management server 450 may notify account movement in a push type to the file servers 100, 200 on the moving side.

When user movement is performed (S220: YES), the routine is advanced to the next processing. When the movement is not found (S220: NO), S210 is repeated (S220).

When the user movement is found, the account management server monitor 119 acquires home directory information of a targeted user (in the example of FIG. 8, the user C (921)) and optimum file server information on the moved side (in the example of FIG. 8, the remote file server 200) from the account management device 452 (230).

Based on the acquired information, the account management server monitor 119 commands the remote copy control device 114 to control copy of the file and directory on the home directory to the remote file server 200 on the moved (destination) side (S240). The copy processing itself is shown in FIGS. 1 to 6.

The remote copy control device 114 executes erasing of the targeted home directory on the local file server 100 on the moving (origination) side at the completion of final copy (S250).

In the above method, only the home directory of the moved user can be moved from the magnetic disk of the local file server 100 onto the magnetic disk of the remote file server 200, not via the public line 300, at user movement.

This embodiment is described with the target of account movement as a user. In another embodiment, targeted account movement includes all targets managed by the account management server. As another preferable example other than movement of the user, with movement of the resource of an application, movement of a disk resource used by the application can be performed according to this embodiment. In this case, the user corresponds to the application, and information related to user belonging (the name of an enterprise, the name of a unit, and the position name/area name of the unit) corresponds to information related to an application environment (server path, director path, and so on). The system configurations and processing are the same. The description of the configuration and processing is thus omitted.

In this embodiment, related information of account attributes with IDs indicating the file servers 100, 200 storing data for each of the attributes is managed on the account management server 450. The related information may be provided in any one of the modules of the file servers 100, 200 (the account management server monitors 119, 219, the remote control devices 114, 214, and the remote copy devices 122, 222). In this embodiment, when receiving a movement notification of an account attribute from the account management server 450, the modules specify the file servers 100, 200 to which data of the account of the moved attribute is transferred, based on the attribute on the moved side and the related information, to transfer the data of the account of the moved attribute to the specified file servers 100, 200. For data transfer, the modules transmit a data transfer command to the remote copy devices 122, 222. When the modules are the remote copy devices 122, 222 themselves, they perform data transfer by themselves.

Next will be described a system configuration and a flow of processing executing movement of an exclusive storage area of the corresponding account after deciding movement or unmovement under a condition for movement selected by the manager and a performance condition on the moved side, when moving the exclusive storage area of the corresponding account on the main storage to the storage area on the sub storage in file or directory units, with movement of account management information managed by the account management server.

Figure 10:
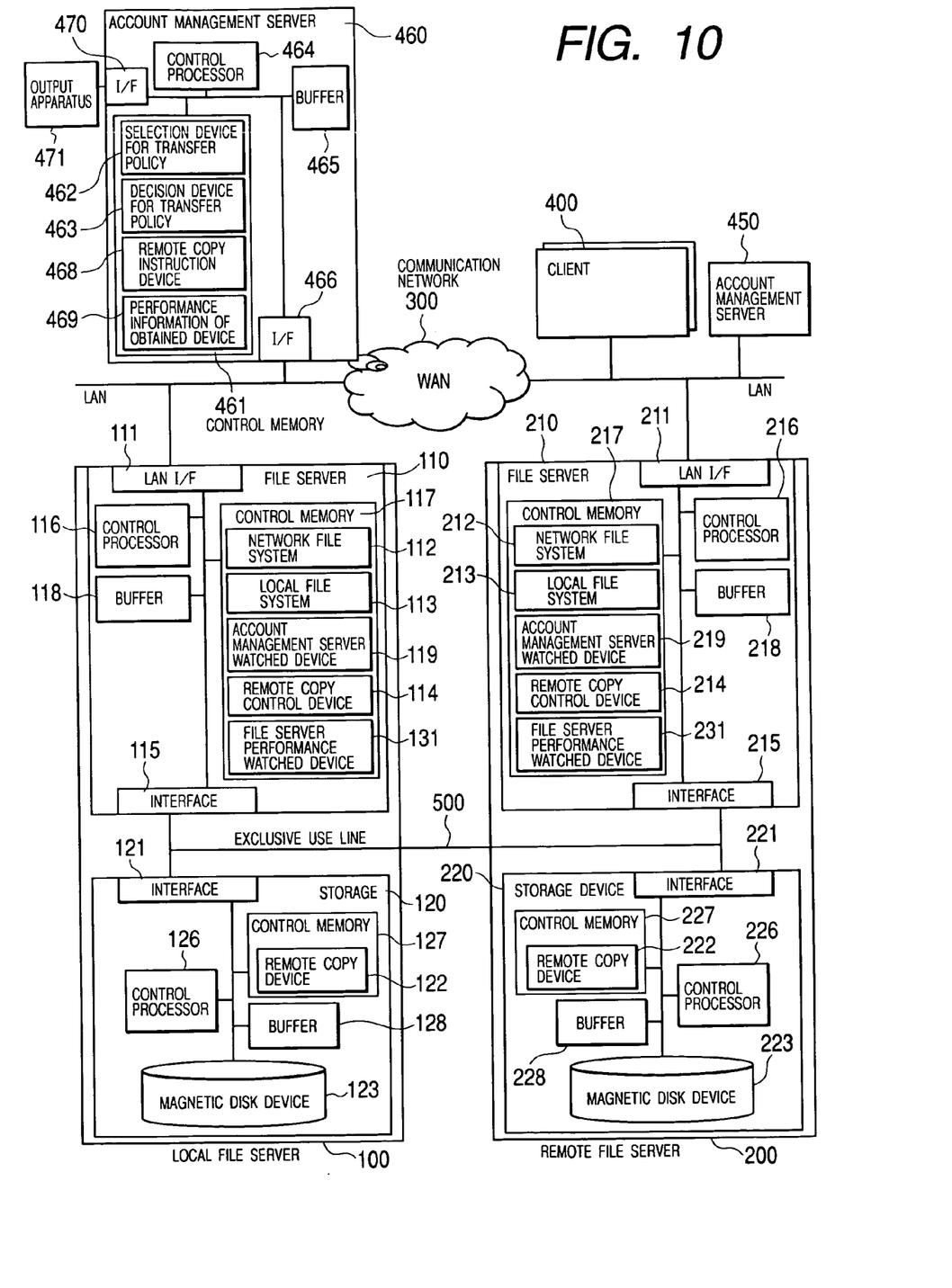
FIG. 10 is a block diagram showing an example of a storage system configuration moving a home directory of a user with user account movement according to an embodiment of the present invention.

FIG. 10 is a block diagram of assistance in explaining a system configuration for deciding movement of a home directory based on the transfer policy command of the manager when moving the home directory of the targeted user from the main storage to the sub storage at user account movement on the user account management server, which is described as the first embodiment.

Basically, the FIG. 10 embodiment has the same configuration as that of the block diagram of FIG. 7. A difference will be mainly described. The present embodiment includes a management terminal 460 having the same hardware configuration as that of the account management server 450 connected to the communication network 300, a selection device for transfer policy 462, a decision device for transfer policy 463, a remote copy command device 468 and a performance information acquiring device 469 on a control memory 461 of the management terminal 460; and file server performance monitors 131, 231 monitoring performance information for each inner component of the file servers 100, 200 on the control memories 117, 217 on the file servers 110, 210.

The management terminal 460 is a computer used by the manager managing the configuration of FIG. 7, and includes a control processor 464 integrally controlling the entire operation, the control memory 461 storing a program executed by the control processor and data, and a buffer 465 temporarily storing data. The management terminal 460 has an output apparatus 471 providing an output screen for receiving the transfer policy from the manager.

The selection device for transfer policy 462 is a means by which the manager selects a condition related to copy movement of the home directory of a targeted user from the main storage to the sub storage at user account movement. Concerning data transfer, there are considered a condition prohibiting data movement between the position of the file server on the moved side and the position of the file server on the moving side by a law such as the export control law and in-house rules, a condition permitting movement only when the distance between the file servers is longer than a predetermined reference, a condition permitting movement only when a belonging unit is different, and a condition permitting movement when I/O performance of the file server 100 on the moving side, load performance of the control processors 116, 126, 216 and 226, network performance of the traffic, and the number of packets lost at the interfaces, meet certain fixed values. The conditions described here are only examples. All information of condition selection about home directory movement of a targeted user is selected by the selection device for transfer policy 462.

The decision device for transfer policy 463 is a means deciding whether copy movement from the main storage to the sub storage is permitted based on the condition of home directory copy movement of a targeted user selected by the selection device for transfer policy 462. When the condition is not satisfied by the decision device for transfer policy 463, the copy movement processing of the home directory of the targeted user from the main storage to the sub storage is stopped.

When the processing is stopped, so that the manager can identify the information, the information may be stored as log information into the storage of the management terminal 460, the information may be displayed on the output apparatus 471, or the information is sent to another apparatus.

When receiving a movement notification of an account attribute, the remote copy command device 468 commands the remote copy control device 114 of the local file server 100 on the moving side of the attribute to perform remote copy based on the decision result of the decision device for transfer policy 462.

The file server performance monitors 131, 231 are means acquiring and managing performance information of the local file server 100 and the remote file server 200. Specifically, they monitor I/O performance to the storages 120, 220, processor load factor performance of the control processors 116, 216, 126 and 226, network performance of the traffic and the number of packets lost at the LAN I/F 111, 211 and the interfaces 115, 215, 121 and 221.

The control processor 464 of the management terminal 460 has the performance information acquiring module 469 acquiring performance information from the file server performance monitors 131, 231.

The selection device for transfer policy 462, the decision device for transfer policy 463, the remote copy command device 468, and the performance information acquiring module 469 are program modules which are executed by the control processor 464 to realize their functions. These modules may be stored into a recording medium (flexible disk, CD-ROM, DVD-ROM, semiconductor memory, and transmission path such as a LAN or SAN) which can be read by the respective controllers. The functions of the modules may be realized by a hardware configuration (semiconductor integrated circuit such as LSI (Large Scale Integration)).

Figure 11:
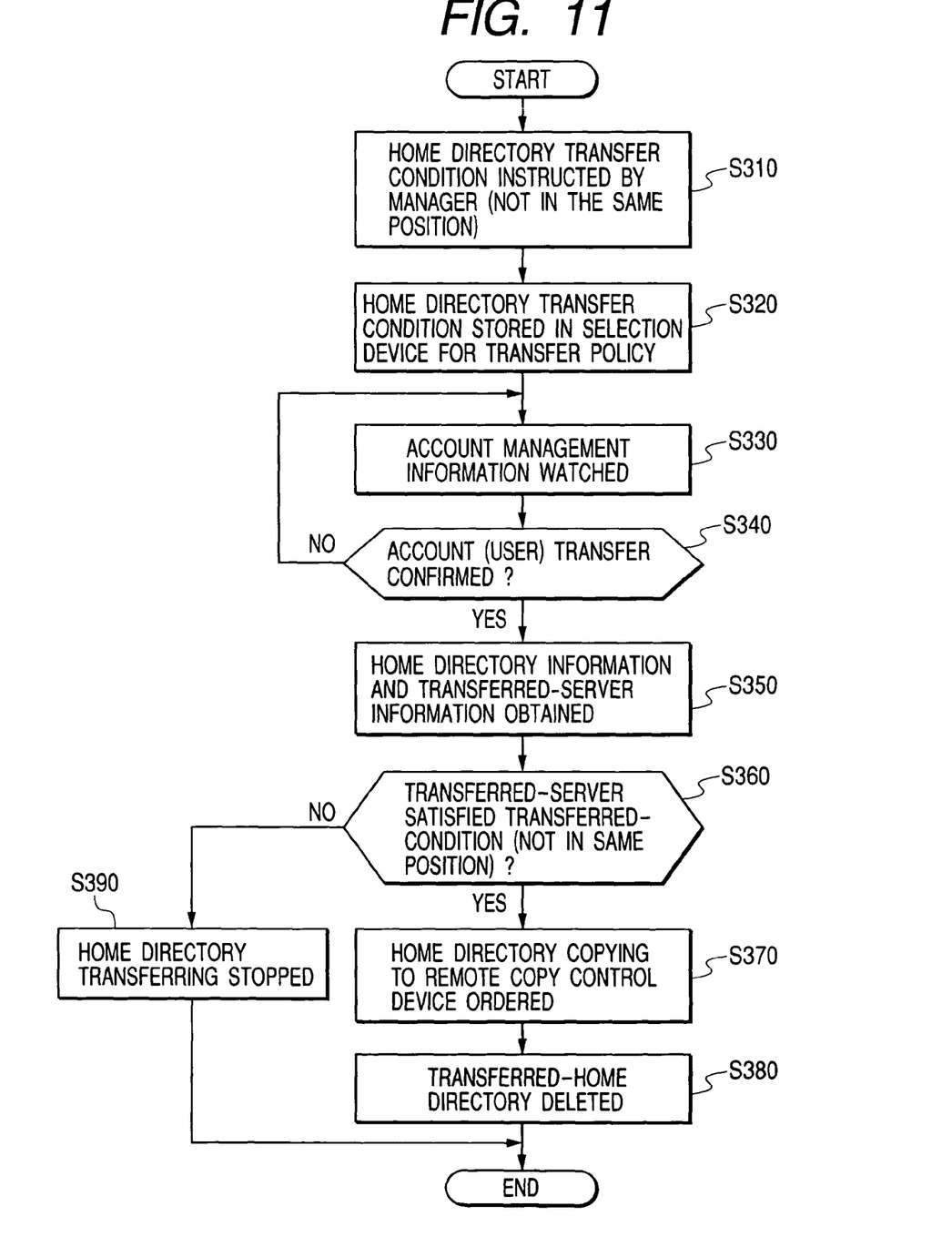
FIG. 11 is a flowchart showing home directory movement processing at user account movement according to an embodiment of the present invention.
Figure 12:
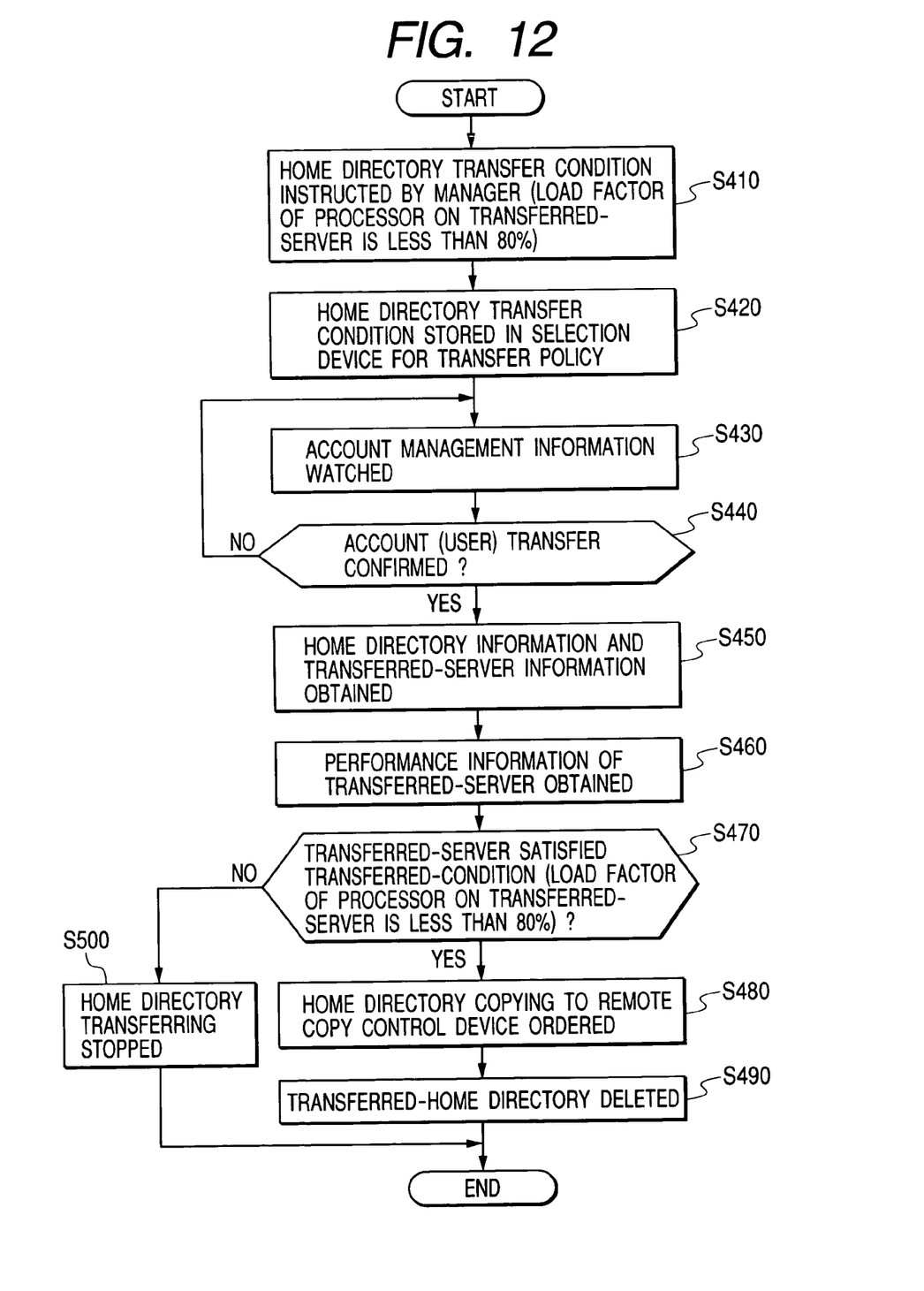
FIG. 12 is a flowchart showing home directory movement processing at user account movement according to an embodiment of the present invention.

In the system configuration of FIG. 10, there are shown two specific examples executing movement of the exclusive storage area of the corresponding account after deciding movement or unmovement based on the condition about data movement specified by the manager, when moving an exclusive storage area of the corresponding account on the main storage to a storage area on the sub storage in file or directory units, with movement of account management information watched by the account management server (FIGS. 11 and 12).

FIG. 11 shows a processing example performing decision based on position information between the local file servers according to this embodiment.

In FIG. 11, after start, the manager selects a condition about data transfer by the selection device for transfer policy 462 of the management terminal 460 (S310). There is given a condition permitting movement when the file server on the moved side is in a different position (in the example of FIG. 8, when the user C921 is moved from the position A901 below the position B 911).

The condition selected in S310 is stored into the decision device for transfer policy 463 (S320).

The account management server monitor 119 on the local file server 100 monitors user movement with account management information of the account management device 452 on the account management server 450 at fixed intervals (S330). The account management server 450 may notify account movement in a push type to the file servers 100, 200 on the moving side.

When the user movement is executed (S340: YES), the routine is advanced to the next processing. When the movement is not found (S340: NO), S330 is repeated (S340).

When the user movement is found, the home directory information of the targeted user (in the example of FIG. 8, the user C (921)) and optimum file server information on the moved side (in the example of FIG. 8, the remote file server 200) are acquired from the account management device 452 (S350).

The decision device for transfer policy 463 compares the information acquired in S350 with the condition selected in S310 to decide whether data movement is permitted (S360). When the data movement is not permitted after the decision (S360: NO), home directory movement is not executed (S390) and the processing is terminated. The decision device for transfer policy 463 may decide whether data movement is permitted based on the information acquired in S350, the condition selected in S310 and the performance value acquired in the performance information acquiring device 469.

When the data movement is permitted after the decision (S360: YES), control of copy of the file and directory on the home directory to the remote file server 200 on the moved side is commanded to the remote copy control device 119 based on the information acquired in S350 (S370).

The copy processing itself is shown in FIGS. 1 to 6. At the completion of final copy, erasing of the targeted home directory on the local file server 100 on the moving side is performed (S380) and the processing is terminated.

FIG. 12 shows a processing example performing decision by the performance value of the local file server on the moved side.

In FIG. 12, after start, the manager selects the condition about data transfer in which movement is permitted only when the performance value of the file server on the moved side (in the example of FIG. 8, the remote file server 200) is below a certain fixed value by the selection device for transfer policy 462 of the management terminal 460 (S410). Assuming that a condition is given permitting movement when the processor load factor of the control processor 216 of the remote file server 200 is within 80%, performance conditions selected in S410 include at least I/O performance to the storages 120, 220, processor load factor performance of the control processors 116, 216, 126 and 226, network performance of the traffic, and the number of packets lost at the LAN I/F 111, 211 and the interfaces 115, 215, 121 and 221.

The condition selected in S410 is stored into the decision device for transfer policy 463 (S420).

The account management server monitor 119 on the local file server 100 monitors user movement with account management information of the account management device 452 on the account management server 450 at fixed intervals (S430). The account management server 450 may notify account movement in a push type to the file servers 100, 200 on the moving side.

When the user movement is executed (S440: YES), the routine is advanced to the next processing. When the movement is not found (S440: NO), S430 is repeated (S440).

When the user movement is found, the home directory information of the targeted user (in the example of FIG. 8, the user C (921)) and optimum file server information on the moved side (in the example of FIG. 8, the remote file server 200) are acquired from the account management device 452 (S450).

Based on the information acquired in S450, the performance information acquiring device 469 acquires performance information of the file server on the moved side (in the example of FIG. 8, the remote file server 200) from the file server performance monitor 231 (S460).

The decision device for transfer policy 463 compares the information acquired in S460 with the condition selected in S410 to decide whether data transfer is permitted (S470).

When the processor load factor exceeds 80% after the decision (S470: NO), home directory movement is not executed (S500) and the processing ends.

When the processor load factor is within 80% (S470: YES), control of copy of the file and directory on the home directory to the remote file server 200 on the moved side is commanded to the remote copy control device 119 based on the information acquired in S450 (S480).

The copy processing itself is shown in FIGS. 1 to 6. At the completion of final copy, erasing of the targeted home directory on the local file server 100 on the moving side is performed (S490) and the processing ends.

In the above method, based on the moving condition selected by the manager, only the home directory of the moved user can be moved from the magnetic disk of the local file server 100 onto the magnetic disk of the remote file server 200, not via the communication line 300, at user movement.

In this embodiment, the example comparing the moving condition as a single condition is given. Decision may be performed based on a plurality of moving conditions.

Also in this embodiment, the account management server monitors 119, 219 are configured in the file servers 100, 200, but may be configured in the management terminal 460.

According to this embodiment, with movement of account management information managed by the account management server, the exclusive storage area of the corresponding account on the main storage can be moved to the storage area on the sub storage in file or directory units. In copy processing with the movement, a dedicated line between storages without using the servers is used and executed. Processing of reading out data from the storage will not occur so that load can be reduced and the copy processing can be faster. The copy processing can be performed without using a communication network such as a LAN or WAN. When the servers perform other processing, copy processing can be executed quickly so that its delay will not occur.

The present invention permits, with account movement, increase of the speed of data transfer of the exclusive storage area of the targeted account (the home directory of the user) and reduction of the load of the controller of the host computer.

The invention claimed is:

1. A storage system having a first storage and a controller, wherein said first storage has an interface connecting said first storage to a second storage of a destination storage system via a communication line, and a remote copy module transferring predetermined data to the second storage of said destination storage system via said communication line, not via said controller, in response to a data transfer command from said controller, and wherein said controller has a remote copy control module transmitting to said remote copy module, in response to a determination by an account monitor module that an authentication account has moved, a data transfer command for transferring predetermined data from said first storage via said communication line to said destination storage system, said determination being made by said account monitor detecting a change of an attribute of said authentication account with movement of said authentication account.

2. The storage system according to claim 1, wherein said remote copy control module transmits to said remote copy module, at reception of said account movement notification from said account monitor module, a data transfer command to said destination storage system, for transferring data corresponding to an authentication account that has moved, and wherein said remote copy module transfers the data corresponding to said authentication account to said destination storage system in response to said data transfer command.

3. The storage system according to claim 1, wherein said remote copy control module transmits to said remote copy module, at reception of said account movement notification from said account monitor module and an ID indicating a storage system storing data corresponding to an authentication account that has moved, a data transfer command for transferring the data corresponding to the authentication account that has moved, to the storage system corresponding to the ID, and wherein said remote copy module transfers the data corresponding to said authentication account to the storage system corresponding to the ID in response to said data transfer command.

4. The storage system according to claim 1, wherein said remote copy control module instructs, at reception of said account movement notification from said account monitor module, a destination storage system storing data corresponding to an authentication account to transmit, to said remote copy module, a data transfer command for transferring, to said specified destination storage system, the data corresponding to the authentication account that has moved, and wherein said remote copy module transfers the data corresponding to said authentication account to said specified storage system in response to said data transfer command.

5. The storage system according to claim 1, wherein said remote copy control module creates pseudo difference information in which the data corresponding to said authentication account is erased only from the first storage to command said remote copy module to data transfer said difference information.

6. The storage system according to claim 1, wherein said authentication account is a user ID, and an attribute of said authentication account is information related to authentication of said user.

7. The storage system according to claim 1, wherein said authentication account is an application ID, and an attribute of said authentication account is information related to an application environment.

8. The storage system according to claim 1, wherein said remote copy control module issues, to said management computer, at reception of an account movement notification from said account monitor module, an inquiry whether predetermined data stored in said first storage is data transferred via said communication line to said destination storage system to decide whether said data transfer command is transmitted to said remote copy module based on a response to said inquiry from said management computer.

9. The storage system according to claim 8, wherein said controller further has a performance monitor module arranged to monitor a performance value for each component in said storage system from which the authentication account is moving, to transmit the monitored performance value to a management computer.

10. The storage system according to claim 1, wherein said account monitor module is provided in said controller.

11. A computer-readable recording medium containing a management program for allowing a management computer to manage a plurality of storage systems, including an originating storage system having a first storage and a controller, wherein when run on the management computer, said management program causes the management computer to execute:

a policy of receiving a notification from an account monitor module that an authentication account has moved, said account monitor module determining that the authentication account has moved by monitoring the change of an attribute of the account with movement of said account; and a policy of transmitting to said originating storage system from which the authentication account is moving, at reception of said account movement notification, a data transfer command for transferring to a second storage of a destination storage system to which the authentication account has moved, predetermined data from said first storage via a communication line connecting the first and second storages of said originating and destination storage systems, respectively, not via said controller.

12. The management program according to claim 11, which causes said management computer to further execute a step of deciding whether a data transfer command of said command module is transmitted based on a condition about data transfer.

13. The management program according to claim 12, which causes said management computer to further execute a policy of receiving said condition about data transfer from a manager.

14. The management program according to claim 12, which causes said management computer to further execute:

a policy of acquiring a performance value for each component in said originating storage system; and a policy of deciding whether a data transfer command of said command module is transmitted based on the performance value for each component in said originating storage system and said condition about data transfer in place of said decision policy.

15. The management program according to claim 12, wherein said condition about data transfer includes a condition for deciding data transfer or data untransfer based on information indicating the locations of the originating and destination storage systems.

* * * * *